United States Patent Office 3,438,463
Patented Apr. 15, 1969

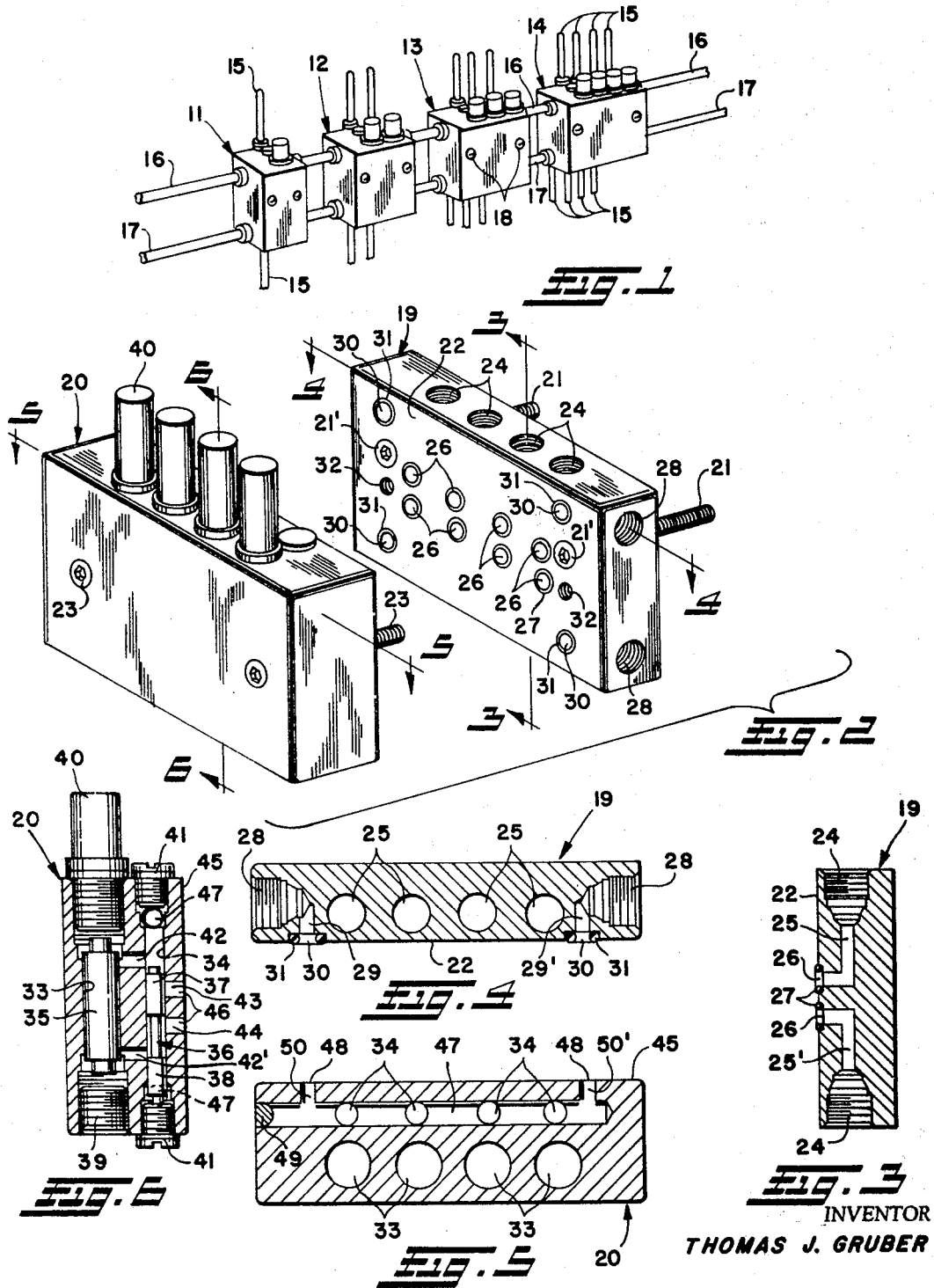

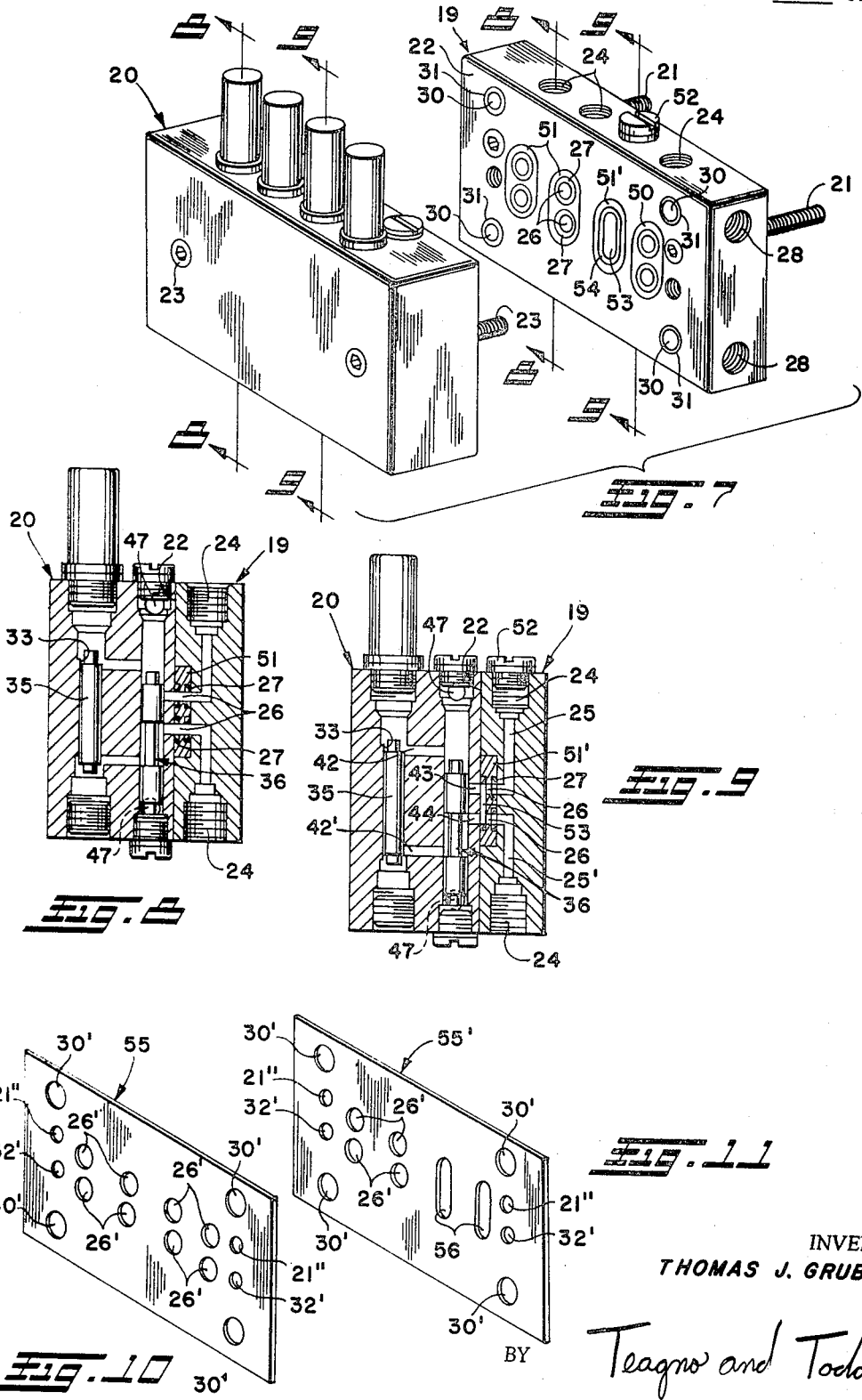

3,438,463
LUBRICANT METERING VALVE CROSS-PORTING
ARRANGEMENT
Thomas J. Gruber, Chagrin Falls, Ohio, assignor to Eaton Yale & Towne Inc., Cleveland, Ohio, a corporation of Ohio
Filed Apr. 29, 1966, Ser. No. 546,434
Int. Cl. F01m 1/06; F16n 7/14, 13/22
U.S. Cl. 184—7          5 Claims

ABSTRACT OF THE DISCLOSURE

A lubricant valve assembly comprising a unitary valve block which includes at least one measuring valve and a manifold block which includes all external inlet and outlet line connections. Lubricant is introduced into the measuring valve within the valve block via the manifold block through a series of inlet passageways. The lubricant is alternately dispensed from the measuring valve to the manifold through a pair of outlet passageways. The pair of outlet passageways in the valve block unit are aligned with and correspond to a pair of outlet passageways in the manifold block unit. The lubricant is dispensed from the passageways in the manifold unit to outlet lines coupled to the members to be lubricated. Also included is a cross-porting structure located at the interface of the valve block unit and the manifold block unit. The cross-porting structure directs the lubricant emanating out of both the outlet passageways of the valve block unit into one of the outlet passageways in the manifold block unit.

The present invention relates to a valve member for a lubricating system which is adapted to supply measured quantities of lubricant to several removed points from a central source of supply. A typical lubricating system usually includes a reservoir for either grease or oil, a pump, and a measuring valve. The measuring valve may comprise a plurality of individual valve blocks each of which contains a piston slideable in a cylindrical bore of the block. Means are provided to reciprocate the piston in a back and forth movement to thereby expel measured quantities of oil or grease from the cylindrical bore. Conduits are usually provided to conduct the grease from the valve block to the bearing. The lubricating valve is a precision manufactured product requiring careful machining of the piston elements as well as the cylindrical bores in which the piston elements reciprocate. Proper operation of the lubricating valve requires that the clearance between the piston and the cylindrical bore of the valve block be carefully controlled so that lubricant cannot pass between the walls defining the cylindrical bore of the block and the piston during a piston discharge stroke and thus decrease the output of the lubricating valve. A decrease in lubricant output of the bearing, quite naturally, may be detrimental to the bearing. Therefore, the life of a lubricating valve employing a reciprocating piston in a cylindrical bore is directly dependent upon the amount of wear of the piston. As the wear increases beyond permissible limits the lubricating valve must be replaced.

Replacement of a lubricating valve in a complete lubricating system necessitates disconnecting all of the conduits secured to the valve and removing the valve body from the machine or support to which said body is secured. In some instances as many as 20 conduits must be removed from a lubricating valve in order that one valve body might be replaced. Replacement of a lubricating valve therefore is relatively expensive in that the machine serviced by the lubricating system must be shut down and numerous tube connections must be broken and reassembled often necessitating replacement of tube coupling components.

Therefore, the general object and nature of this invention is to provide a measuring valve that may be replaced with a minimum of machine down-time and expense.

It is a further object of this invention to provide a measuring valve in which the portion of the valve body subject to wear is quickly and easily detachable from the remainder of the valve body.

A still further object of this invention is to provide a lubricant measuring valve in which the portion of the valve subject to wear may be replaced without disconnection of the various lubricant conduits leading both into and out of the valve body.

A still further object of this invention is to provide a lubricating valve having means therein to simply and inexpensively redirect the valve porting to achieve a variable output of lubricant.

Still another object of this invention is to effect simplicity of design and construction whereby the lubricating valve may be rapidly and conveniently assembled and disassembled with a minimum of expense.

These and other objects of the invention will hereinafter become apparent as the invention is described and claimed.

The invention will best be understood by a reference to the accompanying drawings which form a part of this specification, and in which:

FIGURE 1 is an elevational view of a series of lubricating valves connected into conduits of a lubricating system.

FIGURE 2 is an exploded elevational view of a valve block of this invention showing the two piece construction.

FIGURE 3 is a sectional view taken along the lines 3—3 of FIGURE 2.

FIGURE 4 is a sectional view taken along the line 4—4 of FIGURE 2.

FIGURE 5 is a sectional view taken along the lines 5—5 of FIGURE 2.

FIGURE 6 is a sectional view taken along the lines 6—6 of FIGURE 2.

FIGURE 7 is an exploded elevational view similar to FIGURE 2 showing the cross-porting variations of this invention.

FIGURE 8 is a transverse sectional view of the valve blocks of FIGURE 7 (taken along the lines 8—8) in assembled relation.

FIGURE 9 is a sectional view similar to FIGURE 8 of the valve blocks of FIGURE 7 (taken along the lines 9—9) in assembled relation, incorporating therein a cross porting means.

FIGURE 10 is an elevational view of a gasket that may be employed at the interface between the valve blocks of this invention.

FIGURE 11 is an elevational view of a modified form of gasket that may be employed at the interface of valve blocks of this invention, said gasket incorporating therein cross-porting means.

Now referring more particularly to the drawings, there has been shown therein in FIGURE 1 a portion of a lubricating system comprising lubricating valves 11, 12, 13 and 14. These lubricating valves may be of several designs; the valves as depicted in FIGURE 1 are "Farval Dualine" lubricating valves. For a more complete description of the operation of the "Farval Dualine" valve, reference is made to the Dirkes Patent No. 1,995,342. Valves 11–14 of FIGURE 1 are similar in design and vary only in size or the number of bearings that they may service. In valve 14 of FIGURE 1 there are depicted eight vertical outlet lines 15 conducting lubricant to bearings. Horizontal inlet lines 16 and 17 alternately provide pressurized lubricant to the lubricating valves which lubricant is in turn metered and discharged to the various bearings by means of lines 15.

Each of the valves 11–14 of FIGURE 1 comprise a single valve body which is secured to a suitable support by means of fasteners 18 which pass through the valve body. As is more clearly shown in the Dirkes Patent 1,995,342 each of the valves 11–14 includes at least two pistons that reciprocate in bores of the valve body. Over a period of time as the pistons wear, therefore, it is necessary to completely replace the valve. Using valve 14 of FIGURE 1 as an example, replacement of said valve requires the disconnecting of the eight discharge lines 15 and the four inlet lines 16 and 17. Thus, a total of twelve hydraulic lines must be disconnected from the valve 14 before the fasteners 18 can be removed and the valve body thus disconnected from its support.

In FIGURE 2 there is shown a lubricating valve comprising a manifold block unit 19 and a valve block unit 20. The manifold block unit 19 is adapted to be secured to a machine or other support by means of fasteners 21. The heads 21' of the fasteners 21 are adapted to be received in counterbores in the face 22 of the manifold block 19 such that the valve block unit 20 may be thereafter secured to the manifold block 19 by means of fasteners 23. It is to be understood that the heads 21' of fasteners 21 are received in a counterbore in the face 22 of manifold block 19 such that said heads will be at least flush with or recessed in the face 22 of manifold block 19.

Manifold block 19 is designed to receive both the discharge lines from the measuring valve as well as the inlet lines to the measuring valves. It is anticipated that because there are no moving parts in manifold block 19 that said block may remain permanently secured to a machine or other suitable support during the life of the lubricating system. All of the moving parts in the measuring valve are positioned within the valve block unit 20 which valve block unit may be readily detached from the manifold block unit 19 by means of fasteners 23. Thus, replacement of the worn portions of the valve may be readily accomplished without removal of the various conduits leading both into and out of the valve.

Manifold block unit 19 may be machined from a single piece of metal and includes a plurality of outlets 24. It is to be understood that said outlets 24 are designed to communicate with a discharge line which is suitably secured to the manifold block unit as by means of a suitable tube joint connection (not shown). As is more clearly shown in FIGURE 3 the outlets 24 are in communication with outlet lubricant passageways 25, 25'. Said outlet lubricant passageways 25, 25' terminate as openings 26 in face 22 of block 19. Sealing of said openings is provided by means of O-rings 27 received in counterbores in the face 22.

Inlets 28 are provided in the sides of the manifold block unit 19. Said inlets 28 are similar to outlets 24 and are adapted to receive conduit which is secured to said manifold block unit by means of suitable tube joints. As is more clearly shown in FIGURE 4 inlets 28 communicate with inlet lubricant passageways 29, 29'. Said passageways 29, 29' open at 30 in face 22 of block 19. Openings 30 are provided with sealing O-rings 31 positioned in counterbores in face 22 in a similar manner as are O-rings 27. Tapped holes 32 in face 22 of block 19 are adapted to receive fasteners 23 of the valve block unit 20. It is to be understood that the valve block unit 20 is secured to the manifold block unit 19 which manifold block unit is in turn secured to the machine or support for the lubricating valve.

Reference is now made to FIGURE 6 wherein there is depicted a cross sectional view of the valve block unit 20. Defined in the valve block unit 20 are elongated cylindrical bores 33, 34. A measuring piston 35 is slideable in cylindrical bore 33 and a valving piston 36 is slideable in cylindrical bore 34. As shown in FIGURE 6 measuring piston 35 is a single landed piston and valving piston 36 is a dual landed piston, the lands are depicted as 37, 38.

Cylindrical bore 34 is closed by means of cap screws 41 and cylindrical bore 33 is closed by means of cap screws 39, 40. Said cap screws 39, 40, 41 serve as limiting end positions for the elongated cylindrical bores 33, 34. It is to be understood that measuring piston 35 may be provided with an indicator rod attached to the upper portion of said piston. Said rod may pass through the cap screw 40. The upper portion of the cap screw 40 may be cut away or relieved in order to provide an opening through which visual inspection of the movement of the indicator rod might be accomplished. Thus, means may be provided to visually inspect and verify the movement of piston 35 during operation of the measuring valve.

Ports 42, 42' provide communication between the chamber defined by cylindrical bore 33 and the chamber defined by cylindrical bore 34. Hereafter, the chamber defined by cylindrical bore 33 will be defined the measuring chamber, and the chamber defined by cylindrical bore 34 will be defined the valving chamber.

Outlet passageways 43, 44 are provided in valve block 20 to provide communication between the valving chamber 34 and the face 45 of the valve block unit 20. It is to be understood that outlet passageways 43, 44 terminate in openings 46 in face 45 of valve block 20. It is to be understood that openings 46 in face 45 of valve block 20 correspond to openings 26 in face 22 of the manifold block unit 19. Thus, for each valving piston 36 there are a total of two (2) outlet openings 46 in the face of the valve block unit 20. Corresponding to said two openings are a like number of openings 26 in face 22 of the manifold block unit 19. Thus, as shown in FIGURE 2 (wherein there is depicted a lubricant measuring valve having a total of four valving pistons) there are a total of eight openings 26 in the face 22 of block 19 corresponding to eight openings (not shown) in the face 45 of block 20.

With reference now to FIGURES 5 and 6, an inlet passageway 47 provides communication between adjacent valving chambers 34. As is more clearly shown in FIGURE 5 inlet passageway 47 extends across the valve block unit 20 and communicates with the face 45 of the valve block 20 by means of openings 48 and passageways 50, 50'. Said openings 48 correspond to openings 30 in face 22 of manifold block unit 19.

For ease of manufacture the inlet passageway 47 as shown in FIGURE 5 may be drilled from one side of the valve block 20 and thereafter said passageway closed by means of a plug as shown at 49 in FIGURE 5.

As valve block unit 20 and manifold block unit 19 are secured together by means of fasteners 23, it is to be understood, therefore, that openings 46 in face 45 of valve block unit 20 will overlie openings 26 in face 22 of manifold block unit 19. Similarly, openings 48 in face 45 of valve block unit 20 will overlie openings 30 in face 22 of manifold block unit 19. Further, O-rings 27, 31 in counterbores in face 22 provide sealing at the interface of said blocks. As more clearly shown in FIGURE 4 the O-rings are only partially received in their respective counterbores so that when faces 22, 45 engage, said O-rings will be deformed and compressed into sealing engagement with both the manifold block unit 19 and the valve block unit 20.

Operation of the measuring valve will now be described. Considering FIGURE 1, assume that lubricant from a main source of supply is caused to flow in line 16 from the left side of valve 14 to the right hand side of the valve. Assume further that the valve of FIGURE 2 has been substituted for valve 14 of FIGURE 1. Lubricant thus enters the left hand side of the manifold block 19 through inlet 28 as may be seen in FIGURE 4. Said lubricant is thus conducted into inlet lubricant passageway 29 to the opening 30 at the left hand side of FIGURE 4. As sealing communication is provided between overlying openings 30, 48, FIGURE 5, lubricant is thus conducted into inlet passageway 47 of the valve block unit 20 by means of passageway 50. Lubricant thus flows from left to right of FIGURE 5 and supplies lubricant to each of the valving chambers 34 in the valve block unit 20. Lubricant is thereafter conducted to the right hand side of FIGURE 5 and leaves the valve block unit at opening 48 by means of passageway 50'. Said opening 48 is, of course, in fluid-tight communication with opening 30 in the manifold block unit 19. Lubricant thus is conducted through passageway 29' and back into line 16. Attention is now directed to FIGURE 6. As lubricant enters each of the valving chambers 34 by means of the inlet passageway 47 the valving piston 36 is forced downwardly. As said valving piston 36 bottoms on cap screw 41, land 37 exposes port 42 such that lubricant may be conducted into the measuring chamber 33. Measuring piston 35 is thus forced downwardly under the influence of the pressurized lubricant. As measuring piston 35 is forced downwardly the lubricant in the bottom portion of the measuring chamber 33 is caused to be extruded out of said measuring chamber through port 42'. Note that land 38 of the valving piston 36 has exposed the port 42'. On the downward stroke of the measuring piston 35, lubricant is thus extruded from the measuring chamber 33 to port 42' into the valving chamber 34 and thereafter into the outlet passageway 44. Note that land 37 of valving piston 36 is effectively blocking the outlet passageway 43 thereby directing the expelled lubricant from port 42' through the outlet passageway 44. Expelled lubricant leaves passageway 44 at opening 46 in the face 45 of the valve block unit 20. Openings 46, however, is in direct communication with an opening 26 in the face 22 of the manifold block unit 19. With reference to FIGURE 3, the expelled lubricant entering an opening 26 may be seen to be conducted through outlet lubricant passageway 25' to outlet 24 and thereafter into a conduit 15 (FIGURE 1) which is connected to a bearing.

At this point in time a flow reversing means (not shown) is provided for alternately reversing the flow in the supply line. Such a flow reversing mechanism is known in the art and it is not deemed necessary to herein further describe or illustrate it. Considering FIGURE 1, it is necessary only to point out that a flow reversing mechanism alternately pressurizes lines 16 and 17. We have just considered the operation of the valve as line 16 is pressurized. The lubricating valve now reverses as line 17 is pressurized. Considering FIGURE 1, therefore, as line 17 is pressurized, lubricant is caused to enter the bottom portion of the manifold block unit 19 at an inlet 28. In a manner similar to that as shown in FIGURE 4, lubricant is thereafter conducted to a lower opening 30 in face 22 of the manifold block unit 19 and thereafter into a lower opening 48 in face 45 of valve block unit 20. After entering opening 48 in a manner similar to that as shown in FIGURE 5, lubricant is then caused to flow across the valve block unit in a lower passageway 47 as may be seen in FIGURE 6. Pressurized lubricant is thus directed into the various valving chambers 34 of the valve block unit 20. Pressurized lubricant may exit the valve block unit 20 by means of openings 48 on the right hand side of the valve block unit as viewed in FIGURE 5. Lubricant is thus conducted into the manifold block unit 19 at the lower right hand opening 30 as shown in FIGURE 2 and thereafter continues in the inlet line 17 so as to charge an adjacent lubricating valve.

As lubricant enters the lower inlet passageway 47 the valving piston 36 is forced upwardly. Upward movement of valving piston continues until the upper portion of the piston abuts the upper cap screw 41. In such a position, land 37 will allow communication between port 42 and outlet passageway 43 while land 38 will allow communication between port 42' and lower passageway 47. Lubricant may thus be conducted from lower inlet passageway 47 through port 42' and into the measuring chamber 33 forcing the measuring piston 35 upwardly. Because the upward portion of the measuring chamber 33 is filled with lubricant, an upward movement of the measuring piston 35 extrudes said lubricant out of the measuring chamber 33 into port 42 and because land 37 is in an upward position into outlet passageway 43. In a manner as previously described lubricant in passageway 43 may be conducted to opening 46 of the valve block unit 20 and into a corresponding opening 26 of the manifold block unit 19 to be thereafter expelled from the manifold block unit in conduits 15 secured to block 19 at outlet 24.

The measuring valve operation just described is that of a "Farval Dualine" valve as manufactured by the Farval Division of Eaton Yale & Towne Inc. Reference is had to the Dirkes Patent No. 1,995,342 for a more complete description.

Alternate charging of the inlet lines 16, 17 of FIGURE 1, thus produces a measured discharge of lubricant through the various conduits 15 leading to the respective bearings to be lubricated. As is evident from a comparison of FIGURES 3 and 6 all of the moving parts of the valving mechanism are contained in the valve block unit 20. The manifold block unit 19 provides a means for directing lubricant into the valve block unit as well as directing lubricant out of the valve block unit and into the various conduits leading to the bearings to be lubricated. Thus, it may be seen that over a period of years as the measuring piston 35 and valving piston 36 wear, only the valve block unit 20 need be replaced in order to restore proper operation of the lubricating valve. The manifold block unit 19 to which the numerous conduits are connected may be permanently retained in assembled relation to the machine or other support for the lubricating valve. Replacement of the worn portion of the lubricating valve therefore necessitates only removal of the screws 23, FIGURE 2, removal of the valve block 20, and substitution of said valve block with a new block. Down-time of the machine being lubricated is thus minimized as the numerous lubricant conduits do not have to be disconnected from the lubricating valve as when the valve was manufactured of one-piece or one block construction.

Before describing a modification of the valve of FIGURES 2 through 6, a brief review of the operation of the valve will be helpful. Considering FIGURE 6, movement of the measuring piston 35 either upwardly or downwardly extrudes a given amount of lubricant from the measuring chamber 33 which lubricant passes either through ports 42, 42' depending on whether the measuring piston is moving up or down. Of course, the total amount of lubricant so expelled is dependent on a number of factors including the diameter of the measuring piston 35 and the length of stroke of the measuring piston 35. The diameter of piston 35 is of course fixed at the time of manufacture of the measuring valve. However, the degree to which cap screws 39 and 40 are threadily advanced into the valve body 20 will directly bear on the length of stroke of the piston 35. Therefore, it is possible to achieve adjustable output of lubricant by changing the position of screws 39 and 40 relative to the valve block 20.

Continuing with the operation of the valve as shown in FIGURE 6, the valving piston 36 admits lubricant into the valving chamber 34 as well as the measuring chamber 33. Said valving piston 36 also directs the lubricant from either port 42, 42' to outlet passageways 43 and 44 respectively. Actuation of the valving piston 36 is dependent upon lubricant pressure exerted in either the upper or lower inlet passageways 47. The reversing valve (not shown) in the lubrication system alternately pressurizes the upper and lower inlet passageways 47. Thus considering FIGURE 2, an upward stroke of the measuring piston 35 results in a discharge of lubricant from an upper outlet 24. Similarly, a downward stroke of the measuring piston 35 results in a discharge of lubricant from a corresponding lower outlet 24 (not shown).

Because lubricant requirements for bearings may vary depending on the size of the bearing, it is sometimes desirable to combine the output of two strokes of the measuring piston and feed a double shot of lubricant to a larger bearing. A means by which the output from a single measuring piston on an up and down stroke is combined is termed "cross-porting" in the art. As used herein, therefore, the term "cross-porting" will refer to means by which the output from a single back and forth movement of the measuring piston is combined to achieve a double quantity of lubricant at a single outlet.

Reference is now made to FIGURES 7 through 9 where a modification of this invention having "cross-porting" means incorporated therein is depicted. Thus in FIGURE 7 there is shown a manifold block unit 19 and a valve block unit 20. Said block units are retained in assembled relation by means of fasteners 23. The combined block units are in turn secured to a machine or other suitable support by means of fasteners 21. As in FIGURES 2 through 6 like reference characters are used in FIGURES 7 through 9. Thus as shown in FIGURES 7 through 9, the manifold block unit 19 includes outlets 24 which may provide communication between the manifold block unit and a suitable conduit connected to the block unit in any known fashion. Similarly, inlets 28 provide suitable communication between the manifold block unit and a conduit secured to said manifold block unit in any known manner. The face 22 of manifold block unit 19 is similar to face 22 as shown in FIGURE 2. Thus there are shown four (4) openings 30 in face 22 of FIGURE 7 corresponding to openings 30 in FIGURE 2. These openings 30 communicate with inlets 28 in the same manner as shown in FI1URE 4. As in FIGURE 4, O-rings 31 are secured in the face 22 of FIGURE 7 to insure sealing at the face 22.

In the face 22 of FIGURE 7, however, the structure in the vicinity of openings 26 has been modified in order to incorporate "cross-porting" means in the manifold block unit. Thus there is shown in FIGURE 7, a first porting means 51 and second porting means 51′ inserted in the face 22 of the manifold block unit 19. In FIGURE 8 there is shown in cross section a portion of the lubricating valve employing a porting of the first type 51 and in the FIGUKE 9 there is shown a section of the lubricating valve employing a porting of the second type 51′.

It is to be understood that the operation of the valve as shown in FIGURES 7 through 9 is identical to that as shown with reference to FIGURES 2 through 6. Only the porting in the outlet portion of the valve has been changed to incorporate therein a "cross-porting" capability. Thus it is not felt necessary to redescribe the operation of the valve as shown in section in FIGURES 8 and 9 but rather simple reference can be made to the showing of the measuring piston 35 and valving piston 36 in each of the views of FIGURES 8 and 9. Considering now FIGURE 7 and FIGURE 8, there is shown an insert 51 disposed in a recess in face 22 of manifold block 19. Said insert 51 is of constant thickness and includes therein two openings 26. Surrounding each of the openings 26 are O-rings 27. Said O-rings are disposed in counterbores in the insert 51. As is shown in FIGURE 8, O-rings 27 provide sealing between (a) the insert and the manifold block unit 19 as well as (b) the insert and the valve block unit 20.

The insert 51 of FIGURE 8 has been designated an insert of the first type and when disposed in the counterbore of the face 22 of the manifold block unit 19 provides for regular distribution of the lubricant. That is to say expelled lubricant from the measuring chamber 33 may be directed to either the upper or lower outlet 24 in the manifold block unit 19 depending whether the piston 35 is moving in an upward or downward direction. An equal quantity of lubricant is delivered to each of the two outlets 24 of FIGURE 8.

In FIGURE 9 there is shown an insert 51′ of the second type. Said insert 51′ is generally identical in exterior shape and dimension to insert 51. Insert 51′ is received in a recess in face 22 of the manifold block unit 19 as is insert 51 of FIGURE 8. Insert 51′ is to be utilized in instances where it is desired to direct a larger amount of lubricant to a single bearing. In such cases, a plug 52 as shown in FIGURE 9 may be inserted in either the upper or lower outlet 24 of the manifold block unit 19. Insert 51′ is similar to insert 51 in that there are provided two (2) passageways 26 in the insert. However, on the face of the insert 51′ there is provided an additional recess 53 thereby allowing communication between outlet passageways 43 and 44. Thus as lubricant is expelled from the measuring chamber 33 and is conducted through port 42 into passageway 43 said lubricant may not pass into the upper portion of the manifold block unit 19 (via passageway 25) because of plug 52. Therefore, as said lubricant leaves outlet passageway 43 it is conducted into recess 53 of insert 51′ and thereafter is expelled through the outlet lubricant passageway 25′ to outlet 24 and into the conduit leading to the bearing. Similarly, lubricant from the measuring chamber 33 that is conducted into port 42′ and thereafter into the passageway 44 exits the manifold block unit at the lower outlet 24. Thus the lubricant that would normally be dispensed at the upper outlet 24 of FIGURE 9 is redirected (due to plug 52 and the insert 51′) and a double amount of lubricant is received at outlet 24 at the bottom portion of the manifold block 19.

As is shown in FIGURE 8, the insert 51′ of FIGURE 9 includes various O-rings 27 to insure sealing between the manifold block unit and the insert. However, due to the presence of the recess 53 in the exterior surface of the insert, a single largre sealing ring 54 is required to insure sealing between the insert and valve block unit.

In FIGURES 10 and 11 there are depicted gaskets that might be utilized with the manifold block unit 19 and valve block 20 of FIGURE 2. Thus considering FIGURES 2 and 10, if it is desirable to remove the various O-rings surrounding the openings in the face 22 of manifold block 19 it is possible to utilize a gasket 55 as is shown in FIGURE 10. Said gasket 55 is comprised of a thickness of suitable gasket material such as fiber or elastomeric material and is defined by a plurality of holes in the body of the gasket. As shown in FIGURE 10, the holes have been designated by similar reference characters as in FIGURE 2. Thus, there are provided eight (8) holes 26′ in the gasket 55 corresponding to openings 26 and 46 in the manifold block unit 19 and valve block unit 20 respectively. Openings 30′ are provided in the gasket 55 to correspond generally to openings 30 in the manifold block unit 19 and openings 48 in the valve block unit 20. Holes 21″ in the gasket 55 correspond to the fastener heads shown at 21′ in FIGURE 2 which heads may or may not be flush with the face 22 of the manifold block unit 19. Said heads 21′ of the fasteners 21 may be partially received in the holes 21″ of the gasket 55 as shown in FIGURE 10. Holes 32′ in gasket 55 of FIGURE 10 correspond to the bores 32 of the manifold block 19 and thus enable fasteners 23 from the valve block to protrude through the gasket. Thus as the valve block unit 20 is rigidly secured to the manifold block 19 by means of fasteners 23, gasket 55 provides sealing communication between various of the corresponding openings in the faces 45, 22 of the valve block unit 20 and manifold block unit 19.

A modified form of the gasket as shown in FIGURE 10 is depicted in FIGURE 11. Thus, there is shown a gasket 55′ in FIGURE 11 including a plurality of holes therethrough. However, in place of various of the pairs of holes 26' there is provided slots 56. Said slots 56 provide a similar function as does recess 53 of FIGURE 9 in that by plugging one or another of the various outlets 24 of the manifold block unit 19 the lubricant may be redirected to a corresponding lower outlet and thus double quantity of lubricant normally ejected from the lower outlet. Thus, it may be appreciated that by use of slots in the gasket 55' of FIGURE 11 it is possible to achieve an economical method of "cross-porting." Considering FIGURE 2 through 6 it may be seen that if gasket 55' were inserted between the manifold block unit 19 and the valve block unit 20 and plugs were inserted to the upper outlet 24 at the right hand portion of the manifold block 19 that lubricant when expelled through outlet passageway 43 would be redirected through the slot 56 and would exit the manifold block unit at the lower outlet 24. Similarly, lubricant directed through the outlet passageway 44 would be directed into the lower passageway 25' of the manifold block unit 19 and thereafter expelled through the lower outlet 24 as shown in FIGURE 3.

Thus, a modification as shown in FIGURE 11 of the gasket of FIGURE 10 provides a substitute means of achieving "cross-porting" from that shown in FIGURES 7 through 9.

The invention herein is shown and described in conjunction with a "Farval Dualine" valve. While the "Dualine" valve is the preferred embodiment of the invention, it should not be considered as limiting the scope of the invention. Equally applicable to the invention would be valves of the single line or cyclic type. Examples of cycling lubricating valves may be found in Patent Nos. 2,792,911 and 2,834,433. Thus by this invention there is contemplated a single line or cyclic lubricating valve in which the inlet and outlet conduits of the valve are connected to a first portion of the valve whereas the movable piston means within the valve are concentrated or positioned in a second portion of the valve such that the said second portion may be readily detached from said first portion without the necessity of removing the numerous conduits secured to the valve itself. Considering the Harter Patent No. 2,792,911 as an example it is contemplated by this invention that a single line cyclic lubricant valve could be arranged such that all of the main outlets from the various valve blocks at 33, 34, 39, 40, 45, 46 of FIGURE 15 of Harter are positioned in one or other of the end blocks 21 or 25.

The preferred embodiment of FIGURES 2 and 7 is a "Dualine" valve comprising two separate blocks having mating faces. Communication between the blocks 19, 20 is by means of corresponding openings in the faces 22, 45. These openings of the respective blocks 19, 20 overlie one another. While such overlying openings in the respective faces of the blocks is considered desirable, it is not essential. Indeed it is possible for communication to be effected from one block to the other by means of ports in the respective blocks opening into a groove or grooves in the mating faces. Thus, if the gasket of FIGURE 11 may be considered a metal plate welded or otherwise secured to the face 22 of the manifold block unit 19 of FIGURE 2, groove 56 in the plate 55' may be considered means of communication between the upper outlet passageway 43 of the valve block unit 20 and the lower outlet lubricant passageway 25' of the manifold block unit 19. Therefore, as used within this disclosure the word "communication means" between the manifold block unit and valve block unit may include overlying openings in the faces of the blocks or passageways in the respective blocks that intersect a groove either in a gasket element disposed between the blocks, in one of the faces of the blocks, or a groove in each of the faces of the blocks which grooves overlie each other.

With this description it is believed obvious that the advantages enumerated are obtained, and while I have illustrated and described the preferred form of construction of my invention, I do not wish to limit myself to the precise details of structures shown, but desire to avail myself of such variations and modifications as may come within the scope of the intended claims.

I claim:
1. A lubricant distributor comprising a manifold block unit:
  at least one valve block unit coupled to said manifold block unit;
  said valve block unit having a mating face to engage in abutting relation a corresponding mating face of said manifold block unit thereby defining an interface;
  lubricant inlet means coupled to said manifold block unit and to said valve block unit;
  said valve block unit having a measuring piston bore therein;
  a measuring piston located in said measuring piston bore, said piston being reciprocally movable axially within said bore in response to pressurized lubricant alternately engaging the end faces thereof, said valve block unit having a pair of lubricant outlet passageways connected to said measuring piston bore, each of said outlet passageways alternately transporting lubricant expelled from said measuring piston bore in response to reciprocal movement of said measuring piston, said manifold unit having a pair of lubricant outlet passageways for dispensing said lubricant, said pair of manifold outlet passageways being ported at the interface between said valve block unit and said manifold block unit and being in aligned fluid communication with said pair of outlet passageways in said valve block unit, and means located at the interface of said valve block unit and said manifold block unit for cross-porting said pair of valve block unit outlet passageways thereby directing all of the lubricant emanating from said valve block unit to a single manifold block outlet passageway.

2. A lubricant distributor according to claim 1 wherein said means for cross-porting comprises a gasket means located at said interface having an opening therein providing fluid communication between said valve block unit outlet passageways.

3. A lubricant distributor according to claim 2 wherein said gasket means comprises an O-ring located in a recess surrounding said manifold block unit outlet passageways.

4. A lubricant distributor according to claim 3 further comprising an insert means positioned at the interface of said valve block unit and said manifold block unit, said insert means having a recess therein for interconnecting the respective outlet passageways of said valve block unit and said manifold block unit, said O-ring surrounding the recess and defining a seal between said valve block unit and said manifold block unit.

5. A lubricant distributor comprising a manifold block unit having a lubricant inlet therein, and at least one pair of lubricant outlet pasageways therein for dispensing lubricant to points remote from said manifold block unit, a valve block unit, means for transferring lubricant from said lubricant inlet in said manifold block unit into said valve block unit, lubricant measuring means for measuring the lubricant introduced into said valve block unit into predetermined amounts, said valve block unit including a pair of outlet passageways interconnected to said lubricant measuring means, said lubricant measuring means alternately dispensing said measured lubricant through each of said outlet passageways, said valve block unit being connected to said manifold block unit with respective outlet pasageways being in aligned fluid conducting relation, and cross-porting means positioned at the interface of said manifold block and said valve block unit for directing the flow of lubricant from said pair of valve block unit outlet passageways into a single manifold block unit outlet passageway.

(References on following page)

References Cited

UNITED STATES PATENTS

| | | | |
|---|---|---|---|
| 2,792,021 | 5/1957 | Greeley | 137—596 |
| 2,973,058 | 2/1961 | Bricout. | |
| 3,072,148 | 1/1963 | Carls | 137—596 |
| 3,298,460 | 1/1967 | Porter et al. | |
| 3,323,540 | 6/1967 | Holton | 137—270 |
| 3,323,547 | 6/1967 | Van Husen et al. | 137—269 X |
| 3,324,885 | 6/1967 | Beech | 251—367 X |

OTHER REFERENCES

Product Engineering, Trabon Progressive Lubricating System, November 1930.

LAVERNE D. GEIGER, *Primary Examiner.*

E. J. EARLS, *Assistant Examiner.*

U.S. Cl. X.R.

137—269